May 31, 1966 F. L. DI NARDO 3,254,155
TELEVISION RECEIVER
Filed Oct. 29, 1962
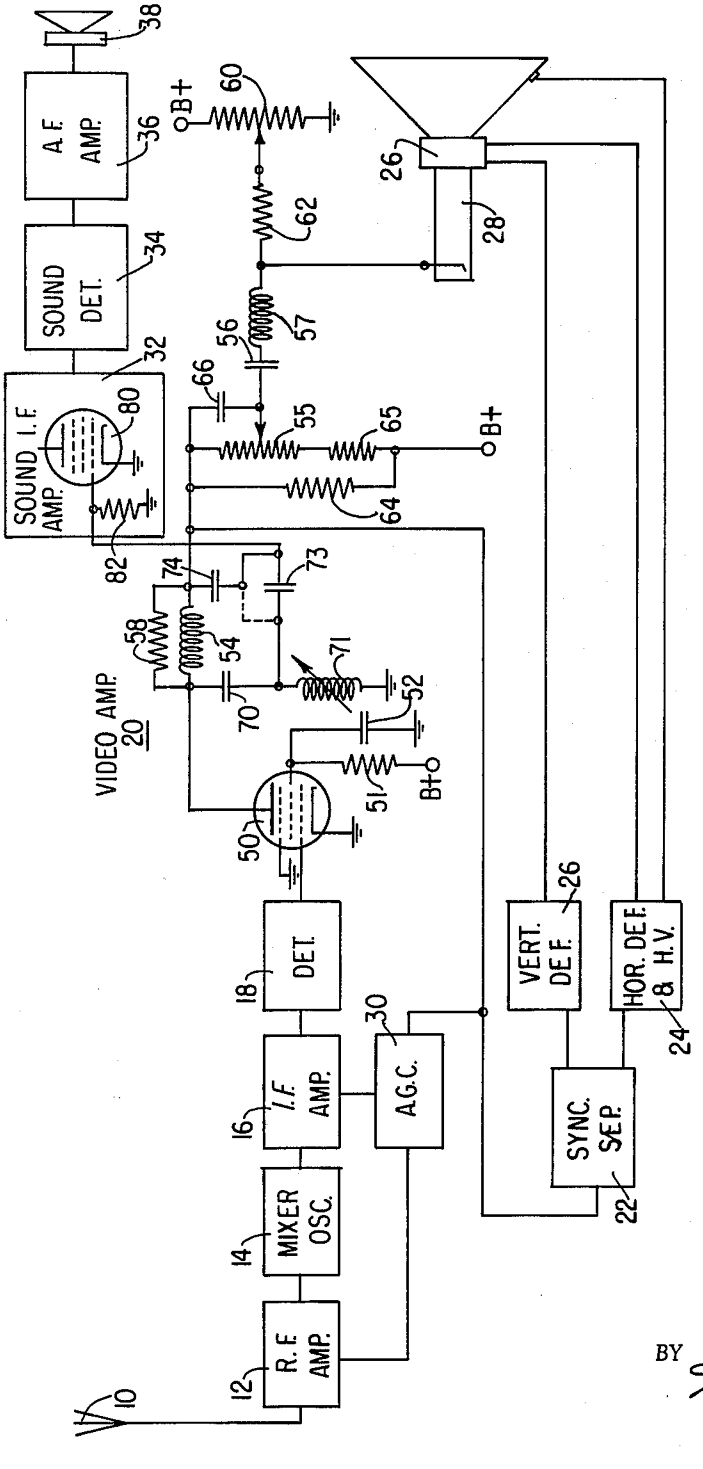
INVENTOR.
Frank L. DiNardo
BY
Mueller & Aichele
Attys.

United States Patent Office 3,254,155

Patented May 31, 1966

3,254,155

TELEVISION RECEIVER

Frank L. Di Nardo, Chicago, Ill., assignor to Motorola, Inc., Chicago, Ill., a corporation of Illinois Filed Oct. 29, 1962, Ser. No. 233,799
4 Claims. (Cl. 178—5.8)

This invention relates to television receivers and more particularly to a circuit for separating video signal components and sound signal components in a television receiver.

In the present day television receivers it is common to detect the amplitude modulated video carrier and amplify this signal in a video amplifier along with the frequency modulated sound carrier which is spaced 4.5 megacycles from the video carrier. At the output of such a video amplifier these two signals must be separated so that the video signal can be applied to the cathode ray tube for image reproduction and the sound signal can be further amplified or limited for proper detecting to provide an audio frequency signal for a loudspeaker. If the separating circuit is not fully effective, some of the sound signal can appear in the picture as a pattern in the television image, or some of the video signal can be produced by the loudspeaker as undesirable buzz or spurious sound.

An object of this invention is to improve the sound and video separating circuit for a television receiver by means of a simple low cost network.

Another object is to provide a single adjustment in a video and sound signal network for maximizing the rejection of the sound signal in the video signal path and at the same time peaking the sound signal in its path to the receiver sound signal channel.

In a particular form of the circuit of this invention, video signal components are coupled from a video amplifier to a cathode ray tube through a series peaking inductor. A series resonant sound signal trap is connected from the video amplifier output to a reference point. A small portion of the sound signal is applied around the peaking inductor to furnish a cancellation signal for any part of the sound signal which may pass through this inductor. Thus, the sound signal can be effectively removed from the video signal applied to the cathode ray picture tube. The sound signal is derived from an intermediate point of the series resonant trap so that it may be obtained at substantially maximum amplitude for application to a sound signal limiter. Tuning of the series resonant trap can thus maximize the rejection of the 4.5 megacycle sound signal as far as the video signal translating network is concerned, and at the same time can maximize the sound signal in its own channel which translates that signal to the sound signal detector.

In the drawing, the figure represents a television receiver, partly in block and partly in schematic, to show the invention.

In the figure, the antenna 10 is connected to the radio frequency amplifier 12 which selects a television signal that is applied to the mixer oscillator circuit 14. The circuit 14 converts a received signal to one of fixed, or intermediate, frequency and this signal is applied to the intermediate frequency amplifier 16. Amplified signals are then coupled to the detector 18 which provides a composite video signal including horizontal and vertical synchronizing pulses, as well as the modulated sound subcarrier spaced 4.5 megacycles from the video carrier frequency. This composite video signal and the modulated sound subcarrier are then coupled to the video amplifier 20 for amplification.

The signal output from the video amplifier 20 is coupled to the synchronizing signal separator circuit 22 which amplitude separates the horizontal vertical synchronizing pulses and applies these respectively to the horizontal deflection system 24 and the vertical deflection system 26 These two systems are connected to the deflection yoke 26 on the cathode ray picture tube or image reproducer 28. High voltage for energization of the screen of tube 28 is also available from the horizontal deflection system 24.

An automatic gain control circuit 30 is also coupled to the video amplifier 20. The circuit 30 produces a control voltage dependent upon the level of the received signal, which is applied to the RF amplifier 12 and the IF amplifier 16 to control the gain of these amplifiers inversely with received signal strength.

The video amplifier 20 further applies the video frequency components to the cathode of the image reproducer 28 in order to develop a television image. It may also be seen that a signal derived from the video amplifier 20 is applied to the sound IF amplifier 32. Amplifier 32 may perform a limiting function to furnish a signal of constant amplitude varying in frequency according to the modulation of the sound subcarrier signal. The sound subcarrier is coupled to the detector 34 which demodulates the signal and provides a signal of audio frequency which is amplified in the amplifier circuit 36. The audio signal is then reproduced as sound by the loudspeaker 38.

Turning now to a detailed consideration of the video amplifier 20, the composite signal is applied to the control grid of the pentode amplifier tube 50 by way of a direct current connection. The cathode of tube 50 is connected to the reference point or ground. The screen grid of this tube is energized through a resistor 51 which is connected to B+, and bypassed by means of a capacitor 52.

Video frequency signals for the television image are derived from the anode of tube 50 and applied through the series peaking inductor 54, a portion of the variable resistor or contrast control 55, the blocking and coupling capacitor 56 and the series peaking inductor 57 to the cathode of the image reproducer 28. The direct current potential of the cathode of tube 28 is established by the variable potentiometer 60 which connects between B+ and ground. The variable arm of potentiometer 60 is adjustable as a brightness control and the potential at this arm is applied through the resistor 62 to the cathode of image reproducer 28. This control can effectively adjust the beam current in tube 28 and therefore the brightness of the reproduced image.

B+ is applied to the anode of tube 50 through the combination of resistor 64 connected in parallel across the series combination of the fixed portion of variable resistor 55 and fixed resistor 65. Variable resistor 55, of course, provides an adjustment of the amount of the video output signal from the amplifier 20 which is applied to the cathode of tube 28, thus adjusting the contrast of the reproduced image. A capacitor 66 is connected from the arm of variable resistor 55 to the top thereof for increasing the coupling of high frequency video signals. As has been previously indicated, the composite video signal is applied to the AGC system 30 and the synchronizing signal separator circuit 22 from the amplifier 20 and this interconnection is made from the junction of the peaking inductor 54 with the video amplifier load comprising resistors 55, 65 and 64.

Inductors 54 and 57 are selected with a value to peak or increase the level of the high frequency video signals in accordance with principles understood in the art. A resistor 58 is shunted across inductor 54 to reduce the Q of the coil 54 and prevent an undue increase in high frequency response by inductor 54, but the combination 54, 58 is primarily inductive in the circuit.

In order to remove or reject the 4.5 megacycle sound signal from the video signal translation path, the capacitor 70 and variable inductor 71 are series connected between the anode of tube 50 and ground. Elements 70, 71 are series resonant at approximately 4.5 megacycles to provide a low impedance path to ground for the sound subcarrier signal. Since the series resonant trap 70, 71 may not be completely effective in removing all of the sound subcarrier, capacitors 73 and 74 are series connected between the interconnection of capacitor 70 and inductor 71 and the side of peaking inductor 54 which is remote from amplifier tube 50. Capacitor 74 is made relatively small so that a small amount of the sound subcarrier will be coupled around inductor 54 with a phase to cancel any remaining part of the sound subcarrier so that substantially none of this signal reaches the video amplifier load for video frequency components, namely resistor networks 55, 64 and 65.

The sound subcarrier can be separated from the detected television signal and derived at a large amplitude across the inductor 71 of the series tuned trap 70, 71. This is accomplished by connecting the interconnection of capacitors 73, 74 to the control grid of the pentode tube 80. A grid input resistor is also connected from the control grid of tube 80 to ground. The tube 80 performs an amplification and limiting function for the FM modulated sound signal which is at 4.5 megacycle. The remaining circuitry of sound amplifier 32 is not shown, as this may be of conventional form. It may be noted that capacitor 73 is in the series path from the signal deriving point at the top of coil 71 so that this capacitor can be charged by grid current drawn in tube 80 as this tube performs its signal limiting function.

As a slight variation in the circuit configuration for deriving the sound signal, it may be noted that capacitor 74 could be connected directly between the end of inductor 54 and the top of inductor 71, as shown by the dotted line, to apply the sound signal cancellation component to the translation path for the video signal. Then the capacitor 73 would be series connected directly between the top of inductor 71 and the control grid of tube 80. The circuit as illustrated in solid lines is equivalent, however, because capacitor 74 is relatively small compared to capacitor 73 so the capacitor network 73, 74, as shown, provides a coupling path for the cancelling signal as well as the sound translation path and limiter input capacitor for the sound IF amplifier 32.

In the described circuit the filter or rejection arrangement for the sound signal in the video signal translation path comprises the inductor 54, the series resonant trap 70, 71 and the cancellation signal path through capacitors 73, 74. The current through the inductor 54 lags the voltage thereacross by some value approaching 90°. A current derived from the junction of capacitor 70 and inductor 71 is coupled through capacitors 73, 74 and this current is equal in amplitude and 180° out-of-phase with the current through inductor 54, as far as the 4.5 megacycle sound signal is concerned. Therefore, this sound signal is eliminated in the video signal component translation path to the image reproducer 28. When the trap inductor 71 is tuned for maximum rejection of the sound signal in the video signal path, the sound signal coupling to tube 80 will be very nearly peaked or at a maximum with the circuit 70, 71 very near series resonance at 4.5 megacycles.

In a system of practical construction the circuit component values were as follows:

| | |
|---|---|
| Tube **50** | 15 HB6. |
| Inductor **54** | 150 microhenries. |
| Variable resistor **55** | 15,000 ohms. |
| Resistor **65** | 4,700 ohms. |
| Resistor **64** | 3,300 ohms. |
| Capacitor **56** | .1 microfarad. |
| Inductor **57** | 100 microhenries. |
| Resistor **58** | 5,600 ohms. |
| Capacitor **70** | 10 micromicrofarads. |
| Inductor **71** | 60 microhenries (nominal). |
| Capacitor **73** | 10 micromicrofarads. |
| Capacitor **74** | .51 micromicrofarad. |
| Resistor **82** | 470,000 ohms. |

Accordingly, by means of the single adjustment of inductor 71 the relatively simple network as described will permit rejection or trapping of the modulated sound subcarrier in the translation path for the video signal components, while at the same time the derived sound subcarrier can be substantially peaked for application to the sound signal channel in the television receiver.

I claim:

1. In a television system for separating video signal components from a sound subcarrier signal, the combination of first circuit means for supplying demodulated video frequency signal components and a sound subcarrier signal, second circuit means for utilizing the video frequency signal components, impedance means interconnected between said first and second circuit means, a trap series resonant substantially at the frequency of the sound subcarrier signal and connected from the junction of said first circuit means and said impedance means to a reference point, further circuit means for deriving the sound subcarrier signal from an intermediate point of said trap, and coupling means connected from said further circuit means to the junction of said impedance means with said second circuit means to apply a phase reversed portion of the sound subcarrier signal to said second circuit means from said trap for cancelling the sound subcarrier signal translated through said impedance means.

2. In a television system for separating video signal components from a sound subcarrier signal, the combination of first circuit means for supplying demodulated video frequency components and a sound subcarrier signal, second circuit means for utilizing the video frequency components, a peaking inductor interconnected between said first and second circuit means, a trap series resonant substantially at the frequency of the sound subcarrier signal and including a capacitor and a trap inductor series connected in the order named from the junction of said first circuit means and said impedance means to a reference point, further circuit means for deriving the sound subcarrier signal from the junction of said capacitor and said trap inductor, and a capacitor connected from said further circuit means to the junction of said peaking inductor with said second circuit means to apply a phase reversed sound subcarrier signal to said second circuit means for cancelling the sound subcarrier signal translated through said peaking inductor.

3. In a television system for separating video signal components from a sound subcarrier signal, the combination of first circuit means for supplying a demodulated video frequency signal component and a sound subcarrier signal, second circuit means for utilizing the video frequency signal component, a peaking inductor connected between said first and second circuits, a trap series resonant substantially at the frequency of the sound subcarrier signal and including a trap capacitor and variable inductor series connected in the order named from said first circuit means to a reference point, first and second capacitors series connected from the junction of said trap capacitor and variable inductor to said second circuit means to apply a phase reversed sound subcarrier signal thereto for cancelling the sound subcarrier signal translated through said peaking inductor, and a sound limiter-amplifier connected to the junction of said first and second capacitors for deriving the sound subcarrier signal as it appears with substantial amplitude across said variable inductor.

4. In a television system for separating video signal components from a sound subcarrier signal, the combination of first circuit means for supplying demodulated video frequency signal components and a sound subcarrier signal, second circuit means for utilizing the video frequency signal components, a peaking inductor connected between said first and second circuits, a trap series resonant at the frequency of the sound subcarrier signal and including a first capacitor and a variable inductor series connected in the order named from said first circuit means to a reference point, a second capacitor connected from the junction of said first capacitor with said variable inductor to said second circuit means to apply a phase reversed sound subcarrier signal thereto for cancelling the sound subcarrier signal translated through said peaking inductor, and a sound subcarrier signal amplifier circuit including a further capacitor connected to the junction of said first capacitor and said variable inductor for deriving the sound subcarrier signal with substantial amplitude from said variable inductor.

References Cited by the Examiner

UNITED STATES PATENTS

| | | | |
|---|---|---|---|
| 2,652,447 | 9/1953 | Crosby | 178—5.8 |
| 2,884,485 | 4/1959 | Shlachter | 178—5.8 |

DAVID G. REDINBAUGH, *Primary Examiner.*

J. McHUGH, J. A. O'BRIEN, *Assistant Examiners.*